United States Patent [19]

Archer

[11] Patent Number: 4,727,671

[45] Date of Patent: Mar. 1, 1988

[54] FISHING UNIT

[76] Inventor: Farley J. Archer, 722 N. 7th St., Edwardsville, Kans. 66111

[21] Appl. No.: 33,653

[22] Filed: Apr. 3, 1987

[51] Int. Cl.$^4$ .............................................. A01K 97/00
[52] U.S. Cl. ........................................................ 43/4
[58] Field of Search ........................... 43/4, 19, 20, 17

[56] References Cited

U.S. PATENT DOCUMENTS

| | | | |
|---|---|---|---|
| 2,655,756 | 10/1953 | Polis | 43/20 |
| 3,641,695 | 2/1972 | Zenick | 43/19 |
| 4,656,772 | 4/1987 | Lopez | 43/4 |

FOREIGN PATENT DOCUMENTS

| | | | |
|---|---|---|---|
| 78632 | 12/1954 | Denmark | 43/20 |
| 878579 | 6/1953 | Fed. Rep. of Germany | 43/20 |

*Primary Examiner*—M. Jordan
*Attorney, Agent, or Firm*—John A. Hamilton

[57] ABSTRACT

A fishing unit consisting of a drum, a fishing line secured at one end to the drum and being wound on the drum with a fishhook and casting weight secured to the other end of the line extending from the drum, and a handle for the drum arranged to be grasped by the user with his forefinger extended to overlie the line windings on the drum to prevent unwinding of the line, with the drum axis substantially parallel to the forefinger, so that when the user moves his forearm and wrist forwardly with a snapping motion, and releases his forefinger from the windings, the hook and weight will be propelled forwardly by their own momentum, with the fishing line spinning freely from the forward end of the drum. The drum is hollow and sealed to be buoyant, so that it will not sink if dropped in water, and the hollow interior is specially configured to permit the storage of additional fishing line, hooks, bait and other fishing gear.

5 Claims, 2 Drawing Figures

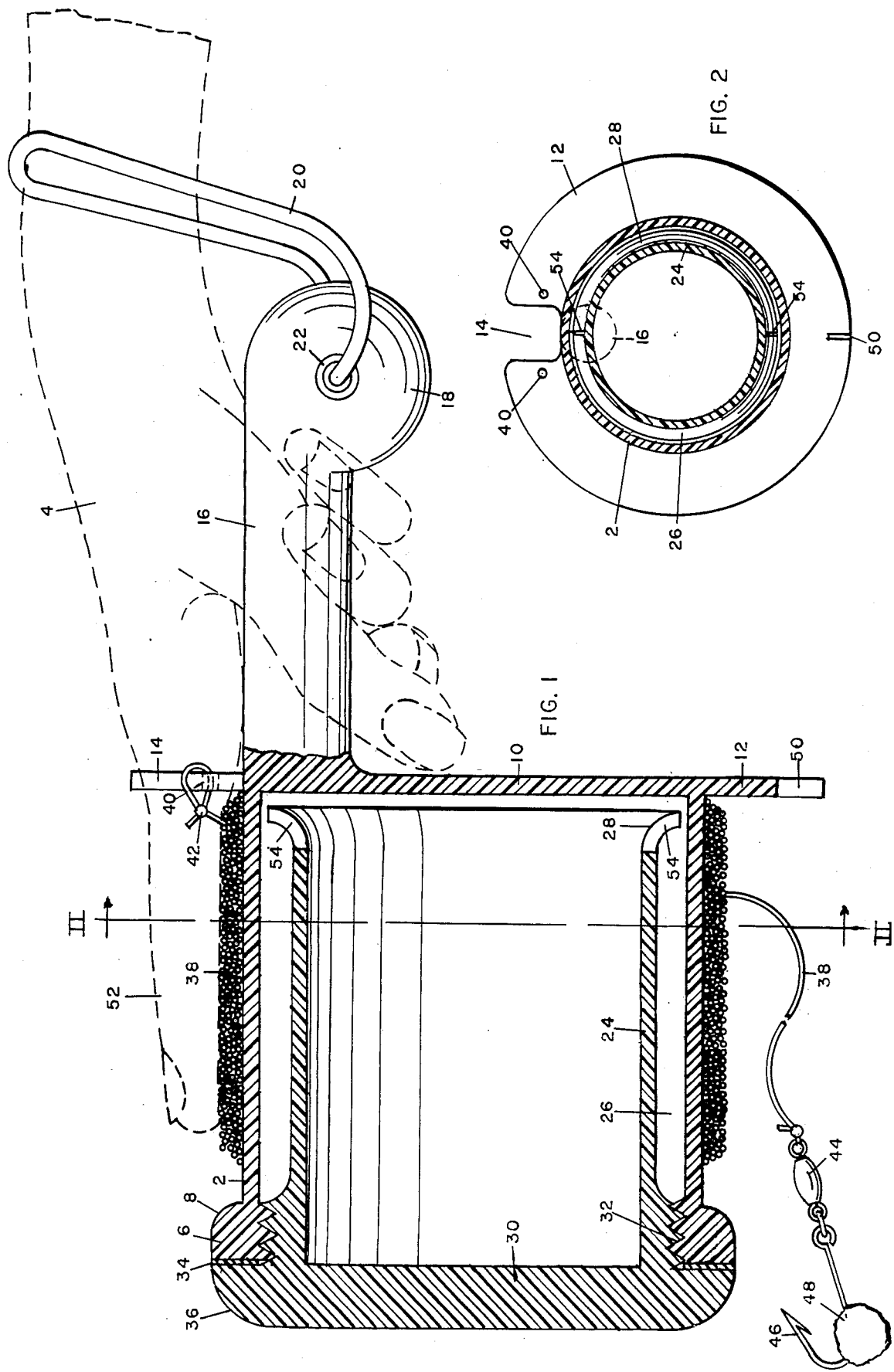

FISHING UNIT

This invention relates to new and useful improvements in fishing apparatus, and has particular reference to a device adapted generally to serve in lieu of the usual rod and reel.

A particular object of the present invention is the provision of a device of the character described which, while extremely small and compact as compared to the usual rod ard reel, nevertheless permits the user to cast the hook, lure and/or bait to substantially the same distances as may be accomplished with the rod and reel. At the same time, the device itself is quite short, being little longer than the user's hand and projecting only slightly beyond his fingertips. This adapts the device for convenient use in crowded conditions, ior example when fishing from piers and the like, where rod and reel casting may well cause entanglement with the lines and gear of other fishermen, and also adapts it for use in the presence of low, overhanging obstructions, such as tree branches and the like. To this end, the device consists generally of a drum to which the line is attached and on which said line is wound manually, the drum being arranged with its axis adapted to be disposed generally parallel to the user's extended forefinger, and having a handle generally parallel to the drum axis which may be gripped by the user with his forefinger extended to lie across the line windings on the drum to prevent unreeling of the line. Then, with the hook, bait ard/or lure left dangling a few inches from the drum, the user snaps the device forwardly with a motion of the wrist and forearm similar to that used in casting with a rod and reel, releasing his finger from the line windings on the drum at the proper moment so that the hook and bait are propelled forwardly by their momentum, with the line unreeling from the forward end of the drum. After the hook and bait enter the water, the bait may be "played", such as by twitching it and pulling it in a series of jerks or the like, and the line retrieved by manually rewinding it on the drum.

Another object is the provision of a device of the character described including means whereby it is rendered buoyant, so that it will not sink and be lost if it is accidentally dropped in water.

Another object is the provision of a device of the character described having a hollow interior which not only renders it buoyant, but also provides storage space for extra fishing line, hooks, bait, lures and other fishing gear which may be required by the fisherman.

Other objects are extreme economy and simplicity of construction, the device having no moving parts in the usual sense of the term, efficiency and dependability of operation, and ease and convenience of use.

With these objects in view, as well as other objects which will appear in the course of the specification, reference will be had to the accompanying drawing, wherein:

FIG. 1 is a longitudinal sectional view, with parts left in elevation, of a fishing unit embodying the present invention, shown in operative position relative to the hand of a user, and FIG. 2 is a reduced sectional view taken on line II—II of FIG. 1, with the fishing line omitted.

Like reference numerals apply to similar parts throughout the several views, and the numeral 2 applies to a hollow cylindrical outer drum, formed of plastic or other suitable material, and having by way of example only the size relationship to the user's hand 4 indicated in FIG. 1. Said drum has an outwardly projecting flange 6 at its forward end (the left end as viewed in FIG. 1), the rearward peripheral edge of said flange being rounded as indicated at 8, and the flange being interiorly threaded as shown. The rearward end of drum 2 is completely sealed by an integral end wall 10, and said end wall is extended to a larger diameter than the drum to form a flange 12. Said flange is interrupted by a notch 14 opening outwardly from the periphery of drum 2. A straight handle 16, parallel to the drum axis but offset eccentrically therefrom to lie flush with the periphery of drum 2, and in angular alignment with notch 14, is formed integrally with end wall 10 and extends rearwardly therefrom. Said handle is provided at its rearward end with an enlargement knob 18, and a flexible cord loop 20 is threaded through an eyelet 22 of the handle and is adapted to be looped about the wrist of the user as shown.

A hollow inner drum 24 is disposed concentrically within outer drum 2, but is of smaller diameter than said outer drum to leave an annular space 26 therebetween. The rearward end of said inner drum is open, and extreme rearward end portion is flared outwardly as indicated at 28. The forward end of the inner drum is closed and sealed by a thick end wall 30 which extends outwardly beyond the diameter of the drum to a diameter equal to that of flange 6, and the extreme forward end portion of drum 24 is externally threaded to mesh with the internal threads of the outer drum, so as to join the two drums detachably, the threaded connection being indicated at 32. A gasket 34 interposed between end wall 30 and flange 6 seals the interior of outer drum 2 when the two drums are joined. The forward peripheral edge of wall 30 is rounded as indicated at 36.

A section of fishing line 38, equal in length or exceeding the distance to which it may be desired to cast, is affixed at one end by knotting it into one or the other of a pair of holes 40 formed through flange 12 at respectively opposite sides of notch 14, as indicated at 42 in FIG. 1, and then wound manually on outer drum 2, as shown. The opposite end portion of the fishing line is left extended from the drum, and has affixed to its extreme end, for example, a lead sinker weight 44 and a fishhook 46, to which bait 48 of any desired type may be applied. The sinker weight supplies the weight or mass necessary for satisfactory casting. If a solid lure is used, it will in most cases supply the necessary weight for casting, and no sinker, or for that matter no separate bait, will be required. The flanges 6 and 12 prevent the line from accidentally slipping off of the ends of the drum. A portion of line 38 immediately adjacent the sinker and fishhook may then be wedged snugly into a narrow slit 50 formed in the edge of flange 12 to secure the line temporarily against unwinding from the drum until it is actually desired to make a cast.

When making a cast, the user first slips cord loop 20 over his wrist, as shown, and grips the shank of handle 16 with the thumb and last three fingers of the hand, while at the same time extending his forefinger 52 through notch 14 of flanga 12 and pressing it downwardly against the windings of line 38 on drum 2, also as shown in FIG. 1, in order to secure the line against unwinding. Then, with the fishhook and bait left dangling a few inches from the drum, and after making certain that the line is not engaged in slit 50 of flange 12, the user moves his forearm and hand forwardly with a snapping motion of the elbow and wrist, the motion being much the same as is used when casting with a rod and reel. He then releases his forefinger from the windings of fishing line 38 at the moment his forefinger reaches a horizontal position, more of less, and the weight of the fishhook and sinker, or of a solid lure if such is used, projects the hook and sinker forwardly to enter the water at a distant point, with the fishing line spinning over flange 6 of the drum, which is rounded to prevent catching or snagging of the line thereon, and to prevent backlash of the line. The precise moment at which the forefinger should be released from the line windings may be determined by practice, and is an easily acquired knack. Generally speaking, release at a higher point, that is, before the forefinger reaches horizontal, will produce longer casts, while release at lower points will produce shorter casts, the different release points producing respectively higher and lower trajectories. The thickening of forward end wall 30 shifts the center of gravity of the device farther toward the forward end of the device, and this is generally conducive to the ability to make longer casts if desired. This effect may be further enhanced by metal inserts in said forward end wall, if desired. The extension of the forefinger as described is conducive to greater accuracy of casting, in that better control of the direction of casting may be had by simply "pointing the finger" in the desired direction. The knob formation 18 at the rearward end of the handle tends to prevent the user's grip on said handle from slipping rearwardly if the hand or handle is wet or slick, and thus tends to maintain the user's hand and forefinger in proper relation to the device. The engagement of cord loop 20 about the wrist prevents the entire device from being "thrown" forwardly if it should accidentally slip free of the user's grip. Once the hook and bait are in the water, the user may retrieve the line, when a fish strikes at the bait, simply by shifting his grip on handle 16 to obtain a whole-hand grip with the drum axis extending generally at right angles to his forearm, and manually rewinding the fishing line on the drum. He may also "play" the bait, for example by retrieving the line in short jerks or twitches, in order to impart more lifelike movements to the bait, which is more attractive to fish.

Gasket 34 completely seals the interior of outer drum 2 against the entry of water, so that the device is rendered buoyant and will not sink if accidentally dropped into water. When the two drums are separated by unscrewing the threaded connection therebetween, extra fishing line may be wound on the inner drum so as to occupy the annular space 26 between the drums when they are reassembled. The ends of this stored line may be secured by wedging them into narrow slits 54 formed in the flared rearward end portion 28 of the inner drum. This stored fishing line is not illustrated in the drawing. Extra fishhooks, bait, lures and other fishing gear, also not shown, may be stored within the hollow interior of the inner drum. Even the fishing line 38 normally wound on the outer drum may be stored within the inner drum temporarily for convenience of handling and transportation, if desired. Thus virtually everything the fisherman may need for a fishing trip may be carried in a neat, very compact package.

While I have shown and described a specific embodiment of my invention, it will be readily apparent that many minor changes of structure and operation could be made without departing from the spirit of the invention.

What I claim as new and desire to protect by Letters Patent is:

1. A hand-held fishing unit comprising:
   a. a cylindrical drum having forward and rearward ends,
   b. a fishing line having one end thereof secured to said drum and being wound on said drum, the opposite end of said fishing line extending from said drum and having a fishhook and casting weight secured thereto, and
   c. handle affixed to said drum and extending rearwardly therefrom, said drum being provided at its rearward end with a radially extending flange, said flange being notched adjacent said handle to permit a user grasping said handle to extend his forefinger therethrough to overlie the line windings on said drum to prevent unwinding of said line from said drum, with the axis of said drum extending forwardly and rearwardly in a direction generally parallel to the user's forefinger, whereby when the user flexes his forearm and wrist forwardly, and then releases his forefinger from the line windings, the fishhook and wight are propelled forwardly, with the line spinning from the forward end of said drum.

2. A hand-held fishing unit comprising:
   a. a cylindrical drum having forward and rearward ends, said drum being hollow and having means completely sealing it against the entry of water into its hollow interior, whereby said fishing unit is rendered buoyant, so that it will not sink if accidentally dropped into water,
   b. a fishing line having one end thereof secured to said drum and being wound on said drum, the opposite end of said fishing line extending from said drum and having a fishhook and casting weight secured thereto, and
   c. a handle affixed to said drum and extending rearwardly therefrom, so disposed that when a user grasps it he may extend his forefinger forwardly to press against the windings of said line on said drum to prevent unwinding of said line from said drum, with the axis of said drum extending forwardly and rearwardly in a direction generally parallel to the user's forefinger, whereby when the user flexes his forearm and wrist forwardly, and then releases his forefinger from the line windings, the fishhook and weight are propelled forwardly, with the line spinning from the forward end of said drum.

3. A fishing unit as recited in claim 2 wherein said drum is formed of separably joined elements, and wherein the hollow interior thereof is specially configurated to contain extra fishing gear such as fishing line, hooks and bait for storage therein.

4. A fishing unit as recited in claim 2 wherein said fishing unit comprises:
   a. an outer cylindrical drum oper at its forward end and being closed at its rearward end by a rearward end wall, said handle being affixed to end extending rearwardly from said rearward end wall,
   b. an inner drum open at its rearward end and being closed at its forward end by a forward end wall, the forward end portion of said inner drum being threader for sealed engagement in an internally threaded forward end portion of said outer drum, said inner drum being of smaller diameter than the internal diameter of said outer drum and extending concentrically thereinto, the inner drum being adrpted for the winding of spare fishing line on the exterior surface thereof, and for the storage of spare fishhooks, bait and other fishing gear in the hollow interior thereof.

5. A fishing unit as recited in claim 4 wherein said outer and inner drums are each provided at both their forward and rearward ends with radially outward flanges whereby to inhibit the accidental unwinding of fishing line therefrom, the rearward flange of said outer drum being notched adjacent said handle to permit the extension of the user's forefinger to overlie the line windings on said outer drum, and the forward flange of said outer drum being rounded to permit the free forward spinning of said line from said outer drum, and wherein said forward end wall of said inner drum is extended radially to coincide with the forward flange of the outer drum, and with the addition of a sealing gasket interposed between the peripheral portion of said forward end wall and the forward flange of said outer drum.

* * * * *